United States Patent
Perlin et al.

(10) Patent No.: US 7,516,444 B2
(45) Date of Patent: Apr. 7, 2009

(54) INTERLACED PROTOCOL FOR SMART CARD APPLICATION DEVELOPMENT

(75) Inventors: Eric C. Perlin, Seattle, WA (US); Vinay Deo, Redmond, WA (US); David Milstein, Redmond, WA (US); Gilad Odinak, Bellevue, WA (US); Scott B. Guthery, Newton, MA (US); Klaus U. Schutz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 10/919,727

(22) Filed: Aug. 16, 2004

(65) Prior Publication Data

US 2005/0022169 A1 Jan. 27, 2005

Related U.S. Application Data

(62) Division of application No. 09/551,957, filed on Apr. 19, 2000, now Pat. No. 6,938,244.

(60) Provisional application No. 60/133,624, filed on May 11, 1999.

(51) Int. Cl.
*G06F 9/44* (2006.01)
*G06K 5/00* (2006.01)

(52) U.S. Cl. .................. 717/125; 717/106; 235/375; 235/380; 235/382

(58) Field of Classification Search .............. 717/106, 717/124–135; 235/375, 380, 382, 439, 441, 235/451, 492
See application file for complete search history.

(56) References Cited

U.S. PATENT DOCUMENTS

| | | | | | |
|---|---|---|---|---|---|
| 4,888,773 | A | * | 12/1989 | Arlington et al. | 714/764 |
| 5,126,541 | A | * | 6/1992 | Shinagawa | 235/438 |
| 5,615,331 | A | | 3/1997 | Toorians et al. | |
| 5,630,049 | A | | 5/1997 | Cardoza et al. | |
| 5,710,884 | A | | 1/1998 | Dedrick | |
| 5,771,240 | A | * | 6/1998 | Tobin et al. | 714/724 |
| 5,787,245 | A | * | 7/1998 | You et al. | 714/38 |
| 5,923,884 | A | | 7/1999 | Peyret et al. | |
| 6,004,049 | A | | 12/1999 | Knox | |
| 6,005,942 | A | * | 12/1999 | Chan et al. | 713/187 |

(Continued)

FOREIGN PATENT DOCUMENTS

EP 0190733 8/1986

(Continued)

OTHER PUBLICATIONS

The use of smart cards in personal communication systems security, Cooke, J.C.; Brewster, R.L., Telecommunications, 1993. Fourth IEE Conference on, Apr. 18-21, 1993, IEEE, pp. 246-251.*

(Continued)

*Primary Examiner*—Wei Y Zhen
*Assistant Examiner*—Satish Rampuria
(74) *Attorney, Agent, or Firm*—Lee & Hayes, PLLC

(57) ABSTRACT

An integrated circuit (IC) card is presented comprising an input/output (I/O) interface and a smart card development interface (SCDI), coupled to the I/O interface, to receive and identify debug frames interlaced within a normal communication flow between the IC card and a host system.

23 Claims, 7 Drawing Sheets

U.S. PATENT DOCUMENTS

| | | | |
|---|---|---|---|
| 6,101,607 A | 8/2000 | Bachand et al. | |
| 6,115,472 A | 9/2000 | Shimizu et al. | |
| 6,148,083 A | 11/2000 | Fieres et al. | |
| 6,157,966 A * | 12/2000 | Montgomery et al. | 710/8 |
| 6,173,419 B1 | 1/2001 | Barnett | |
| 6,195,774 B1 | 2/2001 | Jacobson | |
| 6,296,191 B1 | 10/2001 | Hamann et al. | |
| 6,308,270 B1 | 10/2001 | Guthery | |
| 6,308,317 B1 * | 10/2001 | Wilkinson et al. | 717/139 |
| 6,415,407 B1 * | 7/2002 | Chang | 714/734 |
| 6,427,171 B1 * | 7/2002 | Craft et al. | 709/230 |
| 6,490,720 B1 | 12/2002 | Carlsen et al. | |
| 6,546,546 B1 | 4/2003 | Van Doorn | |
| 6,547,150 B1 * | 4/2003 | Deo et al. | 235/492 |
| 6,581,206 B2 | 6/2003 | Chen | |
| 6,848,097 B1 * | 1/2005 | Alverson et al. | 717/124 |
| 6,910,638 B2 * | 6/2005 | Fruhauf et al. | 235/492 |
| 7,086,036 B2 * | 8/2006 | Boggs et al. | 717/128 |
| 7,140,549 B2 * | 11/2006 | de Jong | 235/492 |

FOREIGN PATENT DOCUMENTS

| | | | |
|---|---|---|---|
| EP | 0292248 | | 11/1988 |
| EP | 0356237 | | 2/1990 |
| EP | 378242 A | * | 7/1990 |
| EP | 0466969 | | 1/1992 |
| EP | 0949595 | | 10/1999 |
| FR | 2667419 | | 4/1992 |
| TW | 424148 A | * | 3/2001 |
| WO | WO 92/13322 | | 8/1992 |
| WO | WO 98/09257 | | 3/1998 |
| WO | WO 98/19237 | | 5/1998 |
| WO | WO 98/25239 | | 6/1998 |
| WO | WO 98/40818 | | 9/1998 |
| WO | WO 98/43212 | | 10/1998 |
| WO | WO 98/52160 | | 11/1998 |

OTHER PUBLICATIONS

Smart cards and product-development strategies in the electronics industry in Japan, Fruin, W.M., Engineering Management, IEEE Transactions on, vol. 45 Issue: Aug. 3, 1998, IEEE, pp. 241-249.*

Investigation of the efficiency of the elliptic curve cryptosystem for multi-applications smart card, Meng Yuan Huang Knowledge-Based Intelligent Electronic Systems, 1998. Proceedings KES '98. 1998 Second International Conference on, vol. 1 Apr. 21-23, 1998, IEEE, pp. 318-323 vol. 1.*

Communication protocol: fetched from http//en.wikipedia.org/wiki/Communications_protocol; fetched on Aug. 29, 2007.*

High-level debugging with the aid of an incremental optimizer, Pollock, L.L.; Soffa, M.L.; IEEE, vol. 2, Jan. 1988, pp. 524-532.*

Design and implementation of ad hoc network protocol debugging environment, ZhiFeng Zhao; ShaoRen Zheng; IEEE, vol. 2, 2001, pp. 855-859.*

Smart cards, Vedder, K.; IEEE, May 1992, pp. 630-635.*

A Java processor suitable for applications of smart card, Zhang Jianjie; Li Feihui; Ge Yuanqing; Yue Zhenwu; Yang Zhilian; IEEE, 2001, pp. 736-739.*

Chan et al.; "Distributed Object Programming Environment for Smart Card Application Development" IEEE. 2001 pp. 251-259.

* cited by examiner

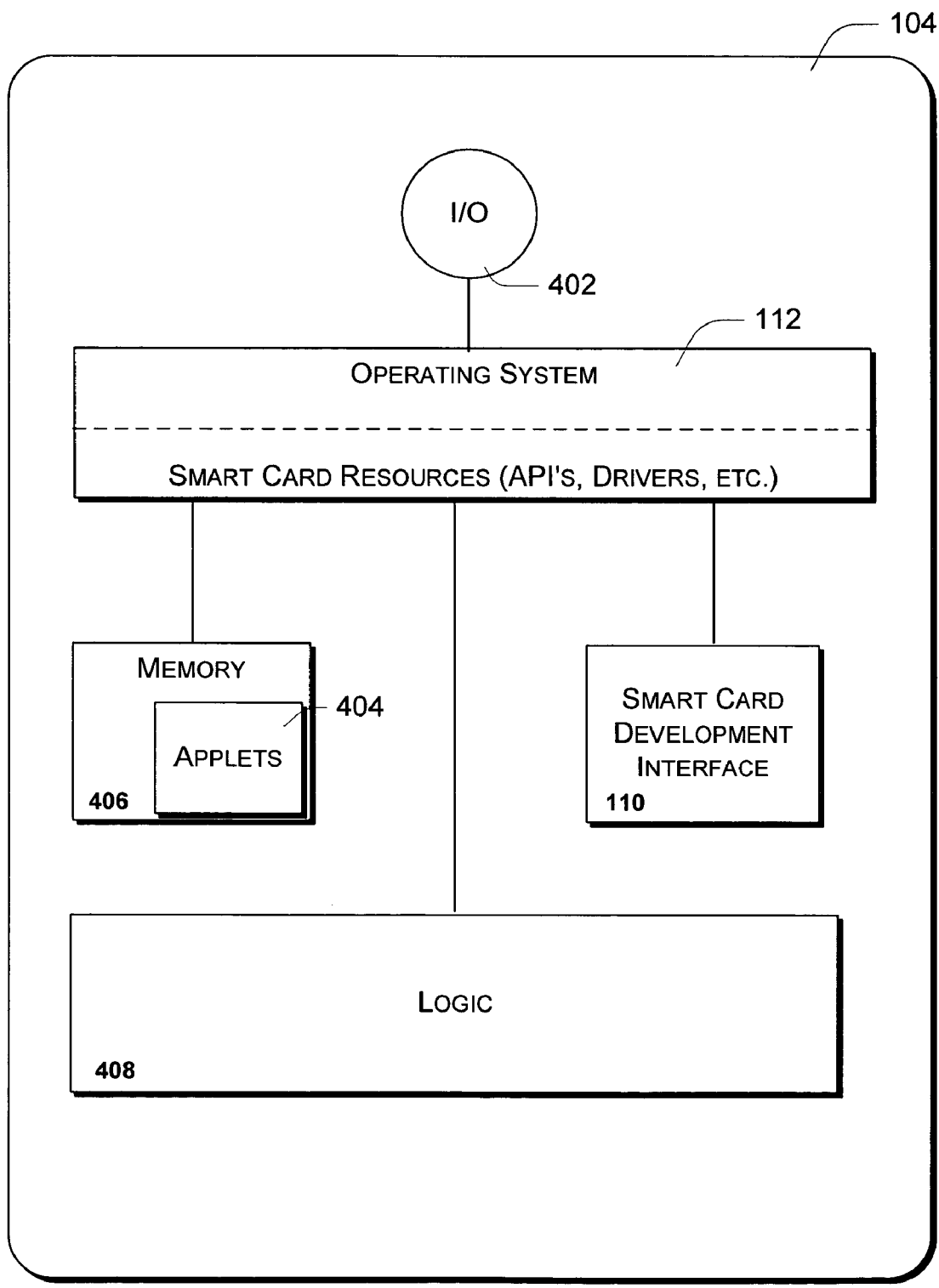

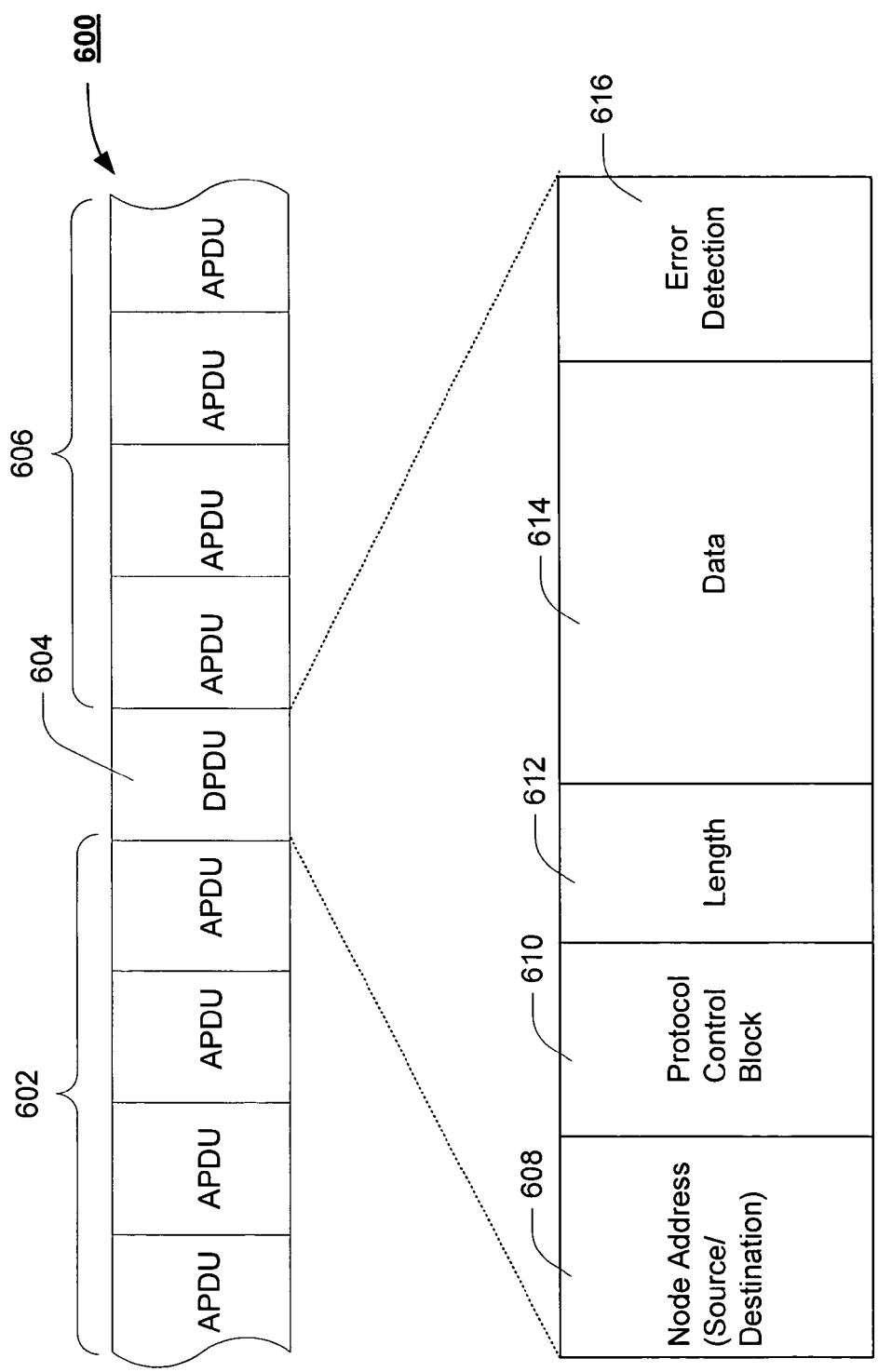

INTERLACED PROTOCOL FOR SMART CARD APPLICATION DEVELOPMENT

RELATED APPLICATIONS

This application is a divisional of U.S. patent application Ser. No. 09/551,957, Now U.S. Pat. No. 6,938,244, titled "INTERLACED PROTOCOL FOR SMART CARD APPLICATION DEVELOPMENT", filed on Apr. 19, 2000, commonly assigned hereto, and hereby incorporated by reference. This application expressly claims the benefit of the filing date established with U.S. Provisional Application No. 60/133,624 filed May 11, 1999 by Perlin, et al. and commonly assigned to the assignee of the present application.

TECHNICAL FIELD

This invention relates to a class of devices commonly known as smart cards and, in particular, to an interlaced protocol for smart card application development.

BACKGROUND OF THE INVENTION

Today there is increasing use of integrated circuit (IC) cards, colloquially referred to as "smart cards", in place of, or in addition to, conventional magnetic stripe cards ("mag cards"). A smart card is a thin card embedded with a memory device (volatile and/or non-volatile) and associated programmable or non-programmable logic. Unlike the mag card that merely stores "static" information (e.g., a credit card account number), a smart card can add, delete and otherwise manipulate information stored on the card. Accordingly, smart cards are capable of storing and executing applications to carry out one or more functions within a smart card.

While the physical dimensions and processing features of the smart card give rise to potentially limitless applications, the reality is that smart card applications are typically only developed for large scale markets, e.g., banking, security and transportation applications. One reason for this limited growth lies in the cost associated with smart card application development. There are several reasons why smart card application development is a costly undertaking, not the least of which is the "closed" nature of the smart card and the limited processing, memory and input/output resources of the smart card.

A smart card is often referred to as a "closed" system because, for security purposes, a smart card is purposefully designed to not expose its memory, intermediate system states or data and address bus information to external devices. To do so would render it susceptible to unauthorized access (hacking) and fraud. While its closed nature is useful for secure applications such as banking transactions, it makes it difficult to utilize prior art smart cards for development purposes. It is to be appreciated that application development often requires access to memory or bus values, or system state information during intermediate processing steps, access that has been specifically designed out of the smart card.

Another encumbrance to the smart card application designer is the limited resources of the smart card. That is, due to the physical and processing constraints placed on the smart card, prior art smart cards do not enjoy any dedicated debug facilities. Aside from the limited processing and memory attributes of a smart card, a smart card typically has but a single, bidirectional input/output (I/O) port. The communication bandwidth of this single I/O port is typically consumed to support execution of the smart card application itself, leaving little to no communication bandwidth to support debug features. Thus, application development using a smart card itself is virtually impossible. Consequently the development of applications for a smart card currently requires the use of an in-circuit emulator (ICE) and an associated, often proprietary software development application.

A ICE system is typically comprised of a printed circuit card coupled to a computer system executing a proprietary software development application associated with the printed circuit card (emulator). The printed circuit card is designed to emulate the functionality of the smart card, while providing additional debug facilities (e.g., I/O ports, memory buffers, address and data lines and the like), thereby providing the developer with the necessary access to adequately debug their applications in development. One limitation of such smart card development systems is that the ICE and proprietary development application are chip-specific. Thus, an emulator for smart card employing a Siemens processor will not work with an emulator employing a Philips or Motorola processor without significant hardware modification. Moreover, the software development application executing on the computer system is also chip-specific, with an associated chip-specific compiler, linker and debugger, and often require that a developer learn the "programming language" of the development tool. Consequently, an application developed on one ICE system cannot be utilized (or directly ported to) a smart card employing a different processor without costly modification.

As a result of each of the foregoing limitations, smart card application development is a costly undertaking, typically performed by the large corporations that stand to profit from the sale of millions of smart cards. History has shown that in order for a new technology to blossom, "grass roots" application development is required. That is, a technology will not truly become a pervasive technology unless and until it is infused with the vitality and creativity of individual programmers and small development companies.

Thus, an improved application development environment is required for smart card applications that is unencumbered by the limitations commonly associated with the prior art. One such solution is presented below.

SUMMARY OF THE INVENTION

This invention concerns an integrated circuit (IC) card, such as a smart card and, more particularly, an interlaced protocol for smart card application development.

In accordance with a first aspect of the invention, an IC is presented comprising an input/output (I/O) interface and a smart card development interface (SCDI), coupled to the I/O interface, to receive and identify debug frames interlaced within a normal communication flow between the smart card and an application executing on a host system.

According to another aspect of the invention, a computer system is presented comprising a client development interface (CDI), to receive and identify debug frames interlaced within a normal communication flow received from a communicatively coupled integrated circuit (IC) card.

According to yet another aspect of the present invention, a protocol enabling smart card application debugging using an IC card is introduced. In particular, a protocol facilitating communication between a host system and an IC card is presented comprising a plurality of application frames and one or more debug frames. The application frames facilitate communication between a host application and one or more smart card resources. The debug frame is interlaced with the application frames comprising normal communication flow to invoke one or more smart card resources. In one embodiment, the host application and the debug application are executing on separate host systems utilizing the resources of an IC card.

It is to be appreciated that combination of the foregoing aspects of the present invention gives rise to an innovative smart card application development system comprising a computer system endowed with the client development interface (CDI), and a smart card incorporating the smart card development interface, wherein communication between the IC card and the computer system adheres to a transport protocol supporting Application Protocol Data Units (APDU) (i.e., a normal communication flow) and innovative Debug Protocol Data Units (DPDU). Accordingly, it will be appreciated that the innovative development interfaces, i.e., the CDI and the SCDI, respectively, represent a significant advancement in smart card application development, enabling a developer to develop smart card applications using an actual IC card, rather than the costly emulators required in the prior art.

BRIEF DESCRIPTION OF THE DRAWINGS

FIG. 4 is a block diagram of an example smart card including a smart card development interface, suitable for use in the smart card application development system of FIG. 1;

FIG. 6 graphically illustrates an example communication flow including a diagram of an example debug frame suitable for use in the application development system of FIG. 1;

DETAILED DESCRIPTION

Example Development System

Figure 1:
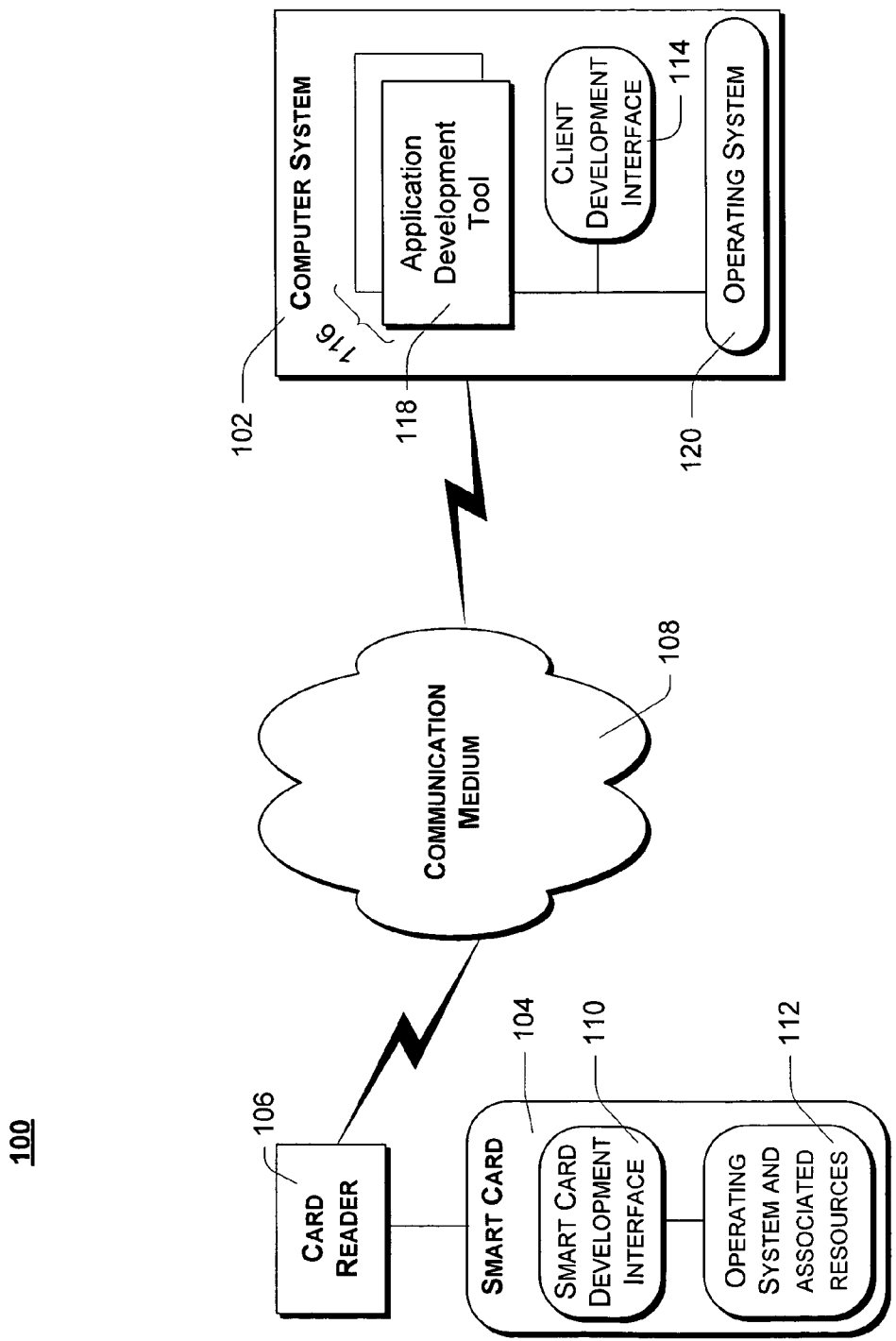
FIG. 1 is a block diagram of an example smart card application development system including a computer system and a smart card.

FIG. 1 illustrates an application development system 100 comprising a computer system 102 coupled to smart card 104 in which a user can develop and debug application code for use on a smart card such as, but not limited to, smart card 104. As shown, the development system of FIG. 1 depicts computer system 102 coupled to smart card 104 via a card reader 106 and a communication medium 108. The communication medium 108 is intended to represent any of a number of typical communication links including, but not limited to, a proprietary data bus, an industry standard data bus, a local area network (LAN), a wide area network (WAN), or a global area network (e.g., the Internet). In this regard, as will be developed more fully below, the innovative application development system 100 facilitates development of smart card applications using an actual smart card 104 coupled to one or more computer system(s) (e.g., 102) via a communications network 108 and a card reader 106.

Smart card 104 comprises an innovative smart card development interface (SCDI) 110 coupled to an operating system (OS) 112. According to one aspect of the invention, to be developed more fully below, SCDI 110 receives and identifies debug frames interlaced with "normal" application frames within the normal communication flow between the smart card 104 and an application executing within an application development tool running on computer system 102.

It is to be appreciated that, but for the innovative smart card development interface 110, smart card 104 and its operating system 112 with associated system resources is intended to represent any of a broad range of integrated circuit cards and their operating systems commonly known in the art. That is, any smart card endowed with the innovative smart card development interface 110 is suitable for use within the innovative smart card application development system 100 of FIG. 1.

It is noted that, in addition to the illustrated smart cards, the IC device might be embodied in other forms, such as an electronic wallet, a personal digital assistant, a smart diskette (i.e., an IC-based device having a form factor and memory drive interface to enable insertion into a floppy disk drive), a PC card (formerly PCMCIA card), and the like. Generally, the integrated circuit card 104 is characterized as an electronic device with limited processing capabilities and memory wherein large size number crunching is impractical.

Card reader 106 provides a necessary interface between smart card reader 104 and a computing system such as, e.g., computer system 102. Card readers are typically designed to support any of a number of standardized communication protocols supported within the smart card community and, in this way, can typically accommodate smart cards adhering to any of the recognized communication standards from any smart card manufacturer. In this regard, card reader 106 is not chip- or card-specific. For purposes of this discussion, card reader 106 includes the necessary hardware and software resources required to support the interlaced debug protocol of the present invention. Consequently, card reader 106 is merely intended to be illustrative of card readers typically known within the art.

Computer system 102 is depicted within FIG. 1 as comprising an innovative client development interface (CDI) 114, a plurality of executable applications 116 including application development tool 118 with a debug environment, and an operating system 120, coupled as shown. The application development tool 118 enables a user to code and debug a smart card application, utilizing a debug environment that generates debug frames. According to one aspect of the present invention, the CDI 114 marshals and interlaces the debug frames with application frames (normal communication flow) generated by the application executing within development tool 118.

As will be developed in more detail, below, CDI 114 receives debug frames from an external application, and interlaces debug frames within the normal communication flow between computer system 102 and smart card 104. According to an exemplary embodiment, the debug frames are generated by a debug environment within application development tool 118 and sent to CDI 114. CDI 114 includes a debug filter to identify debug frames. The debug frames are generated within a unique identifiable attribute such as, for example, embedding an invalid source and/or destination address (e.g., FF hex) within the debug frame.

In addition, CDI 114 receives and identifies debug frames, i.e., response debug frames, sent from smart card 104. The debug filter of CDI 114 identifies the debug frames (e.g., by the invalid source/destination address) and promotes the response to a debug environment, while normal application frames are promoted to the application executing within application development tool 118. But for the client development interface 114, computer system 102, applications 116 and operating system 120 are each intended to represent any of a number of commonly known computer systems, applications and operating systems, respectively, known in the art.

According to one innovative aspect of the present invention, development application 118 is intended to be any of a number of known software development applications (also referred to as software development "tools"). Examples of such software development tools include Visual Basic or Visual C/C++ from Microsoft Corporation of Redmond, Wash. Thus, a smart card application is developed using computer 102 and a typical software development tool 118, utilizing the interlaced debug protocol supported by CDI 114 and SCDI 110 to invoke and interrogate smart card resources to verify the integrity of the developed code. By using common software development tools such as those described above, the smart card application development system 100 does not require the chip-specific, often proprietary software development application and associated compilers, linkers and debuggers that are typical of the cumbersome prior art development systems.

As alluded to above, the inclusion of the innovative CDI 114 and SCDI 110 within development system 100 support an interlaced debug protocol that interlaces debug frames with standard application frames comprising a normal communication flow between computer system 102 and smart card 104. According to one embodiment, the debug frames are generated in response to user interaction with a debug environment of application development tool 118 executing a smart card application. The debug frames are sent to CDI 114, which identifies the debug frames and interlaces such frames with the normal application frames (generated by the application executing within the application development tool) and sent to smart card 104 via card reader 106 and communication medium 108. SCDI 110 receives the communication from computer system 102, identifies and routes the debug frames to a debug monitor, while application frames are promoted to an appropriate application/resource of the smart card (i.e., as identified by a source/destination address). The received debug frames include debug instructions which selectively invoke smart card resources (e.g., API's, device drivers, applications, etc.), providing a user with a heretofore unavailable view of system state information while an application is executing on the smart card. As described above, this state information is priceless during application development.

It should be appreciated that the interlaced debug protocol supported by the innovative CDI 114 and SCDI 110 of the present invention enables a user to employ an otherwise ordinary development tool 118 on an otherwise ordinary computer system to directly utilize the resources of smart card 104 to code and debug smart card applications. In addition to cost and ease of use advantages over the prior art, development system 100 represents a significant improvement over prior art development systems in that the applications developed using the present invention are easily ported from one smart card to another (i.e., the application is not chip specific, as is the case of systems developed using an ICE system). Moreover, insofar as the actual smart card resources are utilized during the development, there is less of a chance for hidden bugs or other undetected compatibility problems as measured against prior art development systems. In this regard, application development system 100 represents a significant improvement over the prior art in terms of cost, ease of use and quality of the end product.

Although the exemplary embodiment above discusses application development and debugging using application development tool 118 and an integrated debug environment, this is for ease of explanation only. An alternate implementation may well provide an independent debug monitor executing on computer 102, in communication with CDI 114 to interlace debug frames within the normal communication flow generated by a host application, independently executing on computer 102. Similarly, a debug application may well be embedded within SCDI 110, or executing on smart card 104 as an independent entity. Thus, the description above and below is to be regarded as merely illustrative, and not limiting, of the spirit and scope of the present invention.

Example Computer System

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 2:
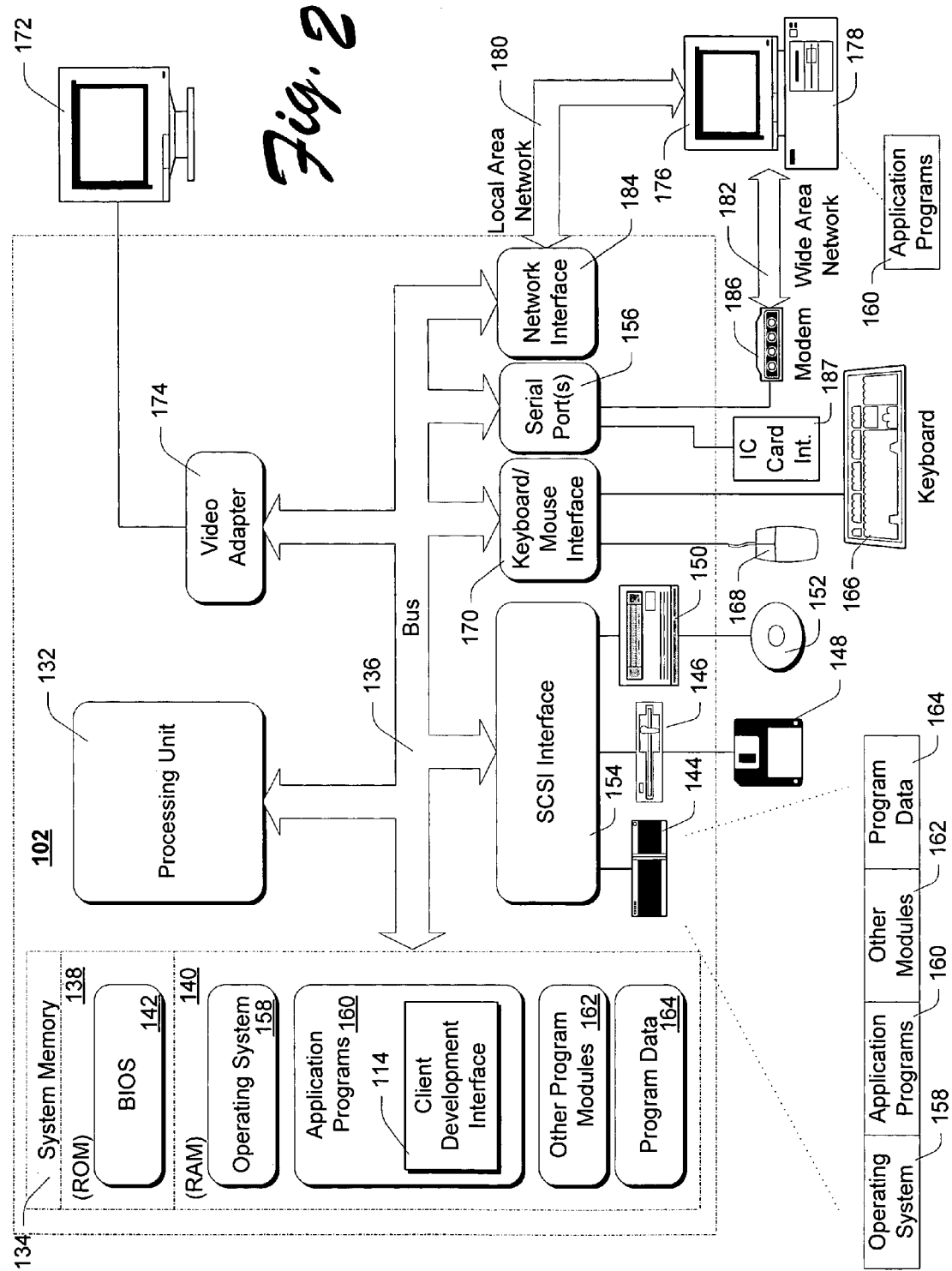
FIG. 2 is a block diagram of an example computer system including a client development interface, suitable for use in the smart card application development system of FIG. 1.

FIG. 2 shows a general example of a computer system 102 incorporating the teachings of one aspect of the present invention, and suitable for use within the smart card application development system 100. It will be evident, from the discussion to follow, that computer 102 is intended to represent any of a class of general or special purpose computing platforms which, when endowed with the innovative client development interface 114, is suitable for use in smart card application development system 100. In this regard, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102. Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative client development interface 114 or application development tool 118, other program modules 162, and program data 164. A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 2.

As shown, the logical connections depicted in FIG. 2 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
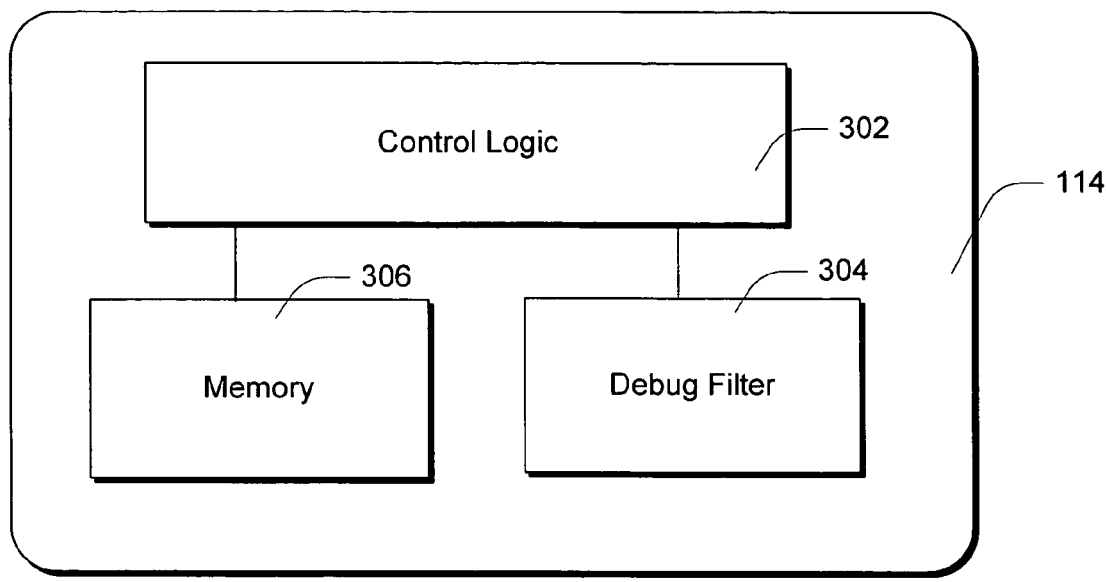
FIG. 3 is a block diagram of an example client development interface including a debug filter, according to one aspect of the present invention.

FIG. 3 illustrates a block diagram of an example client development interface (CDI) 114, suitable for use in computer system 102. As shown, CDI 114 comprises control logic 302, a debug filter 304 and memory 306, each coupled as depicted. CDI 114 may well be characterized as an abstraction layer, enabling higher level applications and resources of computer 102 to access and utilize resources of smart card 104 endowed with SCDI 110 (which may also be characterized as an abstraction layer). With respect to the present invention, the features of CDI 114 are invoked upon detecting a debug frame by debug filter 304. Debug filter 304 detects debug frames by analyzing each of the frames received by the smart card for characteristics denoting a debug frame. According to one implementation, debug filter 304 detects an invalid source and/or destination address in a received frame marking the frame as a debug frame. It is to be appreciated, however, that debug filter 304 can be configured to detect alternative characteristics within a communication frame marking the frame as a debug frame.

Control logic 302 is intended to represent any of a broad range of logic known in the art. In one implementation, control logic 302 is a processor, while in alternate embodiments control logic is a microcontroller, a programmable logic array, or a series of executable instructions which perform logic functions. Control logic 302 communicates with smart card 104 in any of a plurality of standard smart card communication protocols. In alternate embodiments, non-standard protocols may well be used to communicate between controller 302 and smart card 104 such as, for example, a unique development communication protocol. Although not specifically denoted, it is to be appreciated that controller 302 communicates with smart card 104, and any other peripheral for that matter, via the communication resources of operating system 120. Insofar as such resources are well known in the art, they need not be described further here.

Upon detecting the arrival of a debug frame by debug filter 304, control logic 302 marshals the debug frame parameters and interlaces the completed debug frame with application frames comprising the normal communication flow between computer 102 and smart card 104. According to one implementation, control logic 302 analyzes the task to be performed by the received debug frame, and places the debug frame at an appropriate point in the normal communication flow for transmission to smart card 104 via card reader 106 and communication medium 108.

Memory 306 includes one or more buffers wherein control logic 302 communication frames for transmission to smart card 104. In this regard, memory 306 is intended to represent any of a number of alternate memory devices commonly known to those in the art.

Although depicted as a separate functional element, those skilled in the art will appreciate that CDI 114 may well be integrated within and utilize the control features associated with the application development tool 118. In one implementation, for example, control logic 302 and memory 306 may well be supplied by a debug environment within the application development tool 118, wherein CDI 114 is comprised solely of debug filter 304. Accordingly, the teachings of the present invention may well be practiced with variation from the exemplary embodiment without deviating from the spirit and scope of the present invention.

Example Smart Card

FIG. 4 illustrates a block diagram of an example IC card 104 suitable for use within the application development system 100 of FIG. 1. In addition to the innovative smart card development interface (SCDI) 110 and an operating system with associated smart card resources 112, IC card 104 is shown comprising an input/output interface 402, memory 406 having stored therein a plurality of executable applications and/or applets 404, and control logic 408. As discussed above, except for the inclusion of innovative smart card development interface (SCDI) 110, to be described more fully below, smart card 104 is intended to represent any of a broad category of integrated circuit (IC) cards commonly known in the art. Thus, but for SCDI 110, each of I/O 402, applets 404, memory 406 and control logic 408 are likewise commonly known within the art and, consequently, will not be further described here.

Figure 5:
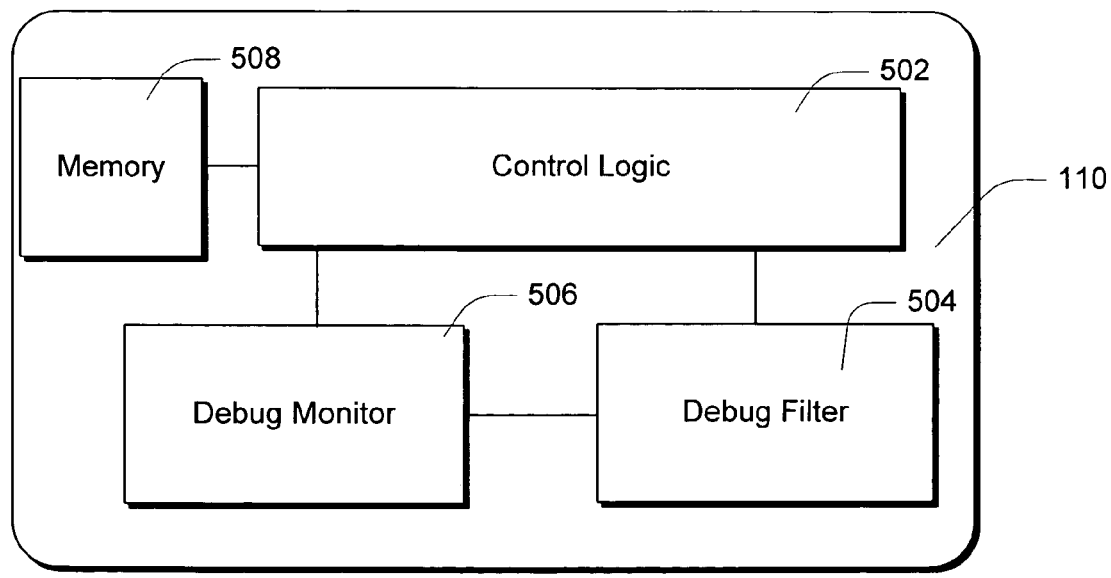
FIG. 5 is a block diagram of an example smart card development interface including a debug filter, according to one aspect of the present invention.

FIG. 5 illustrates a block diagram of an example SCDI 110, suitable for use within any IC card such as, e.g., smart card 104 of application development system 100 in FIG. 1. In accordance with the example implementation of FIG. 5, SCDI 110 is shown comprising control logic 502, debug filter 504, debug monitor 506 and memory 508, coupled as depicted. According to one implementation, SCDI 110 is invoked by CDI 114 upon receipt of a debug frame interlaced within the normal communication flow between computer 102 and smart card 104.

According to this exemplary implementation, control logic 502 may be any of a plurality of discrete logic and/or coded logic functions commonly known in the art such as, for example, a processor, a controller, or a plurality of executable instructions which implement such functionality. Similarly, memory 508 is intended to represent any of a number of memory devices known in the art.

As above, debug filter 504 identifies debug frames within the received communication flow by analyzing each of the frames received by the smart card for characteristics denoting a debug frame. According to one implementation, debug filter 504 detects an invalid source and/or destination address in a received frame marking the frame as a debug frame. It is to be appreciated, however, that debug filter 504 can be configured to detect alternative characteristics within a communication frame marking the frame as a debug frame.

Debug monitor 506 selectively invokes one or more debugging features in response to receipt of a debugging frame, as identified by debug filter 504. According to one implementation, control logic 502 receives a debug frame, as detected by debug filter 504, and promotes the debug frame to debug monitor 506. Debug monitor controls and/or interrogates smart card resources (e.g., API's, device drivers, applications, etc.) in accordance with the debug instructions contained within the debug frame. As will be described more fully below, the debug monitor 506 can read/write smart card memory 406, get/set breakpoints in a smart card application 404, sequentially step a smart card application 404, run a smart card application 404, release a smart card application 404, and obtain the context of control logic 408. Although depicted as an element of SCDI 110, debug monitor 506 may well be implemented as an independent debugging application resident on smart card 104, without deviating from the spirit and scope of the present invention.

Example Data Structures

FIG. 6 is a graphical illustration of a communication flow between a host computer 102 and smart card 104 including one or more interlaced debug frames, according to one aspect of the present invention. The innovative communication flow 600 is shown comprising a plurality of application protocol data units (APDU's) 602 and 606, selectively interlaced with one or more debug protocol data unit (DPDU) 604 which enables an independent debug application to share communication resources with a host application to control and interrogate the otherwise closed architectural resources of a smart card. It is to be appreciated that, although depicted at the APDU level this is for ease of explanation only. That is, alternate embodiments are contemplated wherein interlacing of debug frames is performed at a block-level, i.e., at a lower level of communication. In this regard, it is to be appreciated that the DPDU is a construct of convenience to illustrate the features of the present invention. Alternate implementations at using lower-level or higher-level communication protocols are anticipated within the scope and spirit of the invention.

According to one implementation, the communication flow is a command/response communication protocol, initiated by the host system (e.g., computer 102). As alluded to above, the APDU's 602, 606 adhere to any of a number of accepted application protocols employed to communicate information between host applications and smart card applications. Accordingly, they need not be further described.

The DPDU 704 adheres to any of a number of accepted transport protocols used to communicate information between a smart card and a host system (e.g., a computer system). FIG. 6 breaks out DPDU 704 to denote a number of constituent fields including, but not limited to, a node address field 608, a protocol control block 610, a length field 612, a data field 614 and an error detection field 616. It is to be appreciated that the illustrated size of the fields do not necessarily correspond to relative block sizes, and the order of the fields may well be changed without deviating from the spirit and scope of the present invention.

The node address field 608 contains source and/or destination address information. More specifically, the node address field 608 includes information regarding the virtual address of the application issuing the frame (source address) and the address of the application to which the frame is being sent (destination address). According to one aspect of the invention, a debug frame is denoted as such by embedding invalid source and/or destination addresses in the node address field 608. Upon receiving a communication flow, debug filter (304, 504) identifies the invalid source and/or destination address and routes the debug frame to a debug application or monitor.

The protocol control block 610 denotes whether the frame is a command frame or a response frame, and whether the received frame is the last frame in a communication, or whether more frames follow to deliver the data required to complete the communication instance.

As their names imply, the length field 612 provides an indication as to the length of the frame, while the data field 614 carries the instructions/data communicated between the host and the smart card. According to one implementation, the data field 614 includes debug instructions that direct a debug monitor 506 of a SCDI 110 to perform some task. Examples of such debug instructions (in pseudo code) and their effect include:

Debug (run app_x, Data)—execute an application using Data

Debug (get context)—obtain the context of smart card control logic

Debug (read memory)—read smart card memory

Debug (step)—step an application executing on the smart card.

Debug (set breakpoint)—set a breakpoint within an application executing on the smart card.

Debug (run)—execute application on smart card until event (e.g., breakpoint)

Additional debug instructions and their function can be found within the Appendix attached hereto.

The error checking field 616 of DPDU 604 includes information utilized by a development interface (i.e., CDI 114 or SCDI 110) to verify the integrity of the received frame. Any of a number of suitable error checking schemes may well be used such as, for example, inclusion of a checksum.

Example Operation

Figure 7:
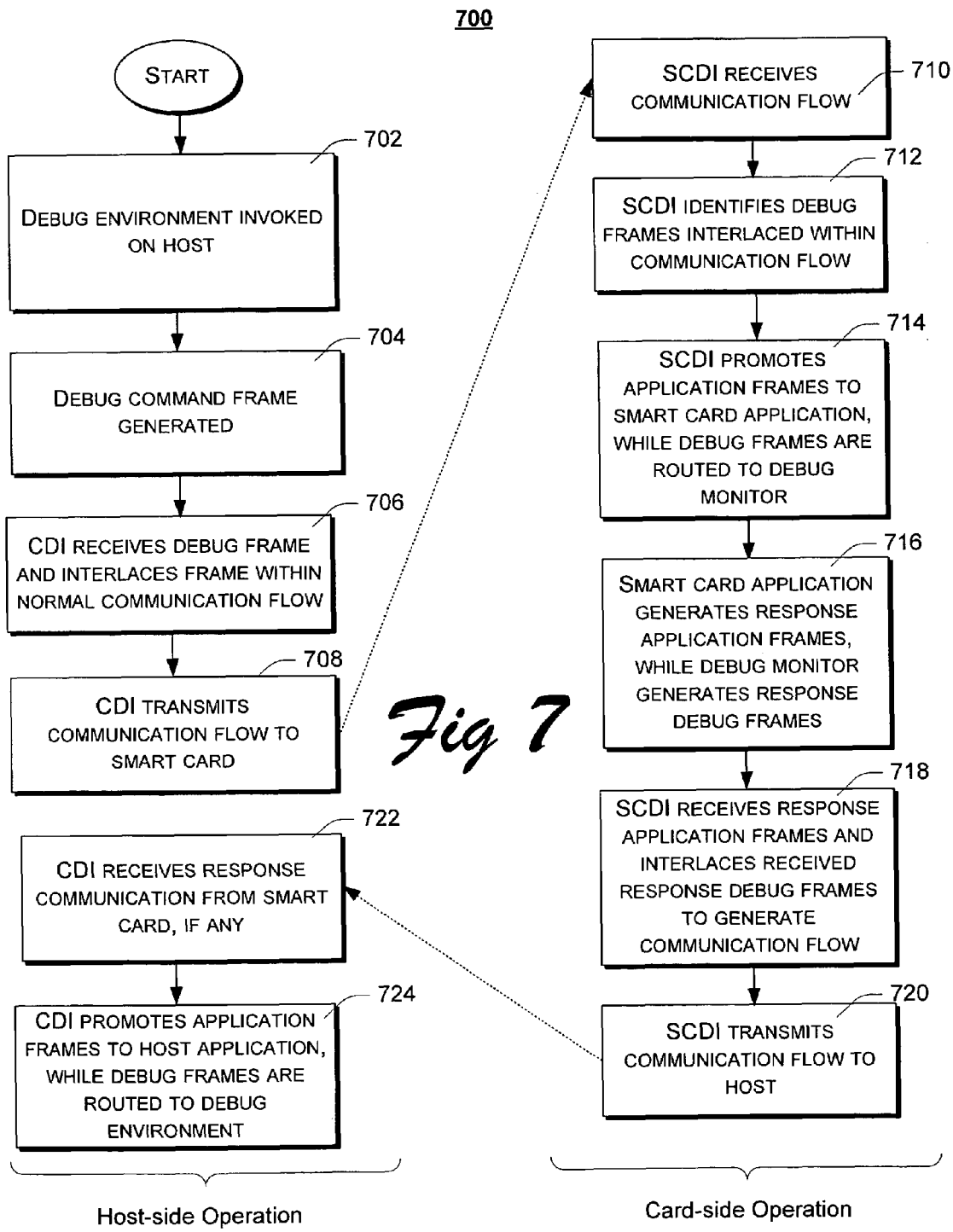
FIG. 7 is a flow chart of an example method for debugging an IC card application using an interlaced debug protocol, according to one aspect of the present invention.

FIG. 7 is a flow chart of an example method for debugging an IC card application using an interlaced debug protocol, according to one aspect of the present invention. For ease of explanation, and not limitation, the method of FIG. 7 will be developed with continued reference to FIGS. 1-6.

Turning to FIG. 7, the method begins with step 702 wherein the debug environment of a host computer 102 is invoked. In one implementation, the debug environment resides within application development tool 118, while in alternate embodiments, the debug environment is a stand-alone application 116.

In step 704, a debug command frame is generated within the debug environment. More specifically, a user instructs the debug environment to invoke a debug feature of coupled smart card 104. As described above, the debug environment marks the debug frame as such utilizing an invalid address in node address field 608 of the generated debug frame (e.g., DPDU 604). Once generated, the debug frame is sent to the CDI 114.

The CDI 114 receives the debug frame and interlaces the received debug frame with other application frames comprising the normal communication flow, step 706. As described above, debug filter 304 identifies the received debug frame by detecting an invalid address within the node address field 608 of the received DPDU 604. Having interlaced the debug frame within the normal communication flow, CDI 114 transmits the communication flow to the smart card 104, via card reader 106 and communication medium 108.

In step 710, SCDI 110 receives the communication flow, and identifies the debug frame(s) interlaced within the communication flow in step 712. More specifically, SCDI 110 receives the communication flow via I/O interface 402, whereupon debug filter 504 detects one or more frames with an invalid address populating the node address field 608, while the error detection field 616 does not indicate any error of transmission. Accordingly, controller 502 concludes that such received frames are debug frames.

In response to receiving the communication flow with interlaced debug frames, steps 710 and 712, controller 502 of SCDI 110 promotes application frames to an appropriate smart card application 404, while the debug frames are routed to debug monitor 506, step 714. Controller 502 identifies the appropriate smart card application 404 to route the application frames using information (e.g., source and/or destination address information) embedded within node address field 608.

In response to receiving the communication frames, the appropriate smart card application 404 (i.e., the one to which the application frames were addressed) performs in accordance with the program code of the application and any instructions received in the application frames, subject to the debug monitor 506. Similarly, debug monitor 506 controls smart card resources according to debug instructions received in the debug frames to control execution of smart card application 404 and/or to interrogate smart card resources. In response to execution of received communication frames (i.e., application and debug) within their respective applications (i.e., smart card application and debug monitor), smart card application 404 may generate response application frames. Similarly, debug monitor 506 may generate response debug frames depending, of course, on the point at which execution of the applications is suspended, step 716. In this manner, debug monitor 506 of SCDI 110, in response to the innovative interlaced debug protocol, manage execution of smart card applications, and disclosure of smart card state information to facilitate application development.

In step 718, SCDI 110 receives the response application frames generated by smart card application 404 and interlaces received response debug frames generated by debug monitor 506, if any, to generate a response communication flow. The communication flow is transmitted to the computer system 102 via communication medium 108 and card reader 106, step 720.

In step 722, CDI 114 receives the response communication flow from the smart card 104. More specifically, debug filter 304 receives and analyzes the response frames to detect debug frames. In step 724, controller 302 of CDI 114 promotes application frames to the host application 116, while identified debug frames are promoted to the debug environment.

Figure 8:
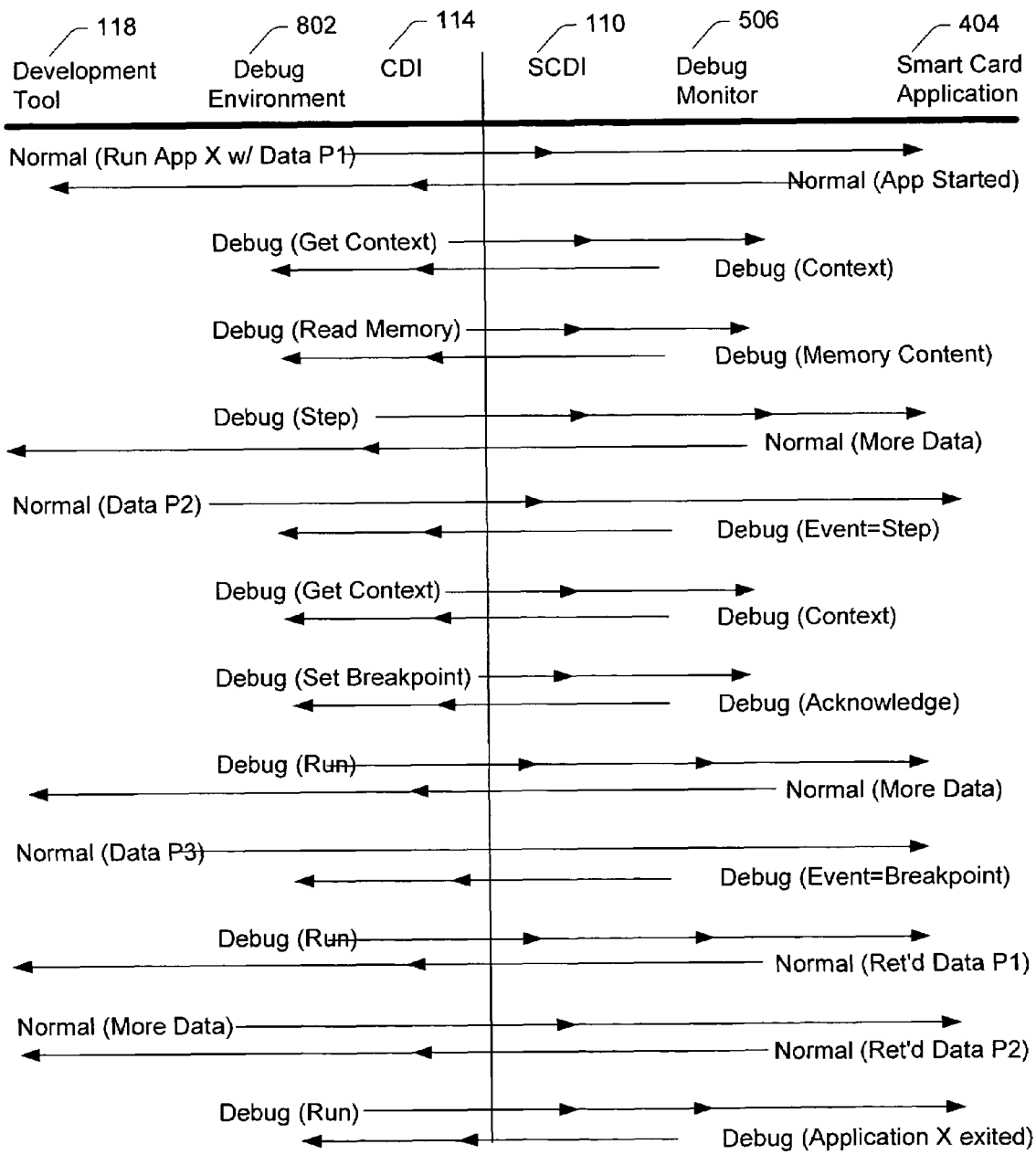
FIG. 8 illustrates a signaling diagram for an example communication flow between a host system and a smart card utilizing the interlaced debug protocol of the present invention.

Turning briefly to FIG. 8, a signaling diagram for an example communication session between a host system and a smart card utilizing the interlaced debug protocol of the present invention is presented. As shown, the communication is broken down according to the functional elements discussed above, namely, between application development tool 118, a debug environment 802, CDI 114, SCDI 110, debug monitor 506 and a smart card application 404. According to one embodiment of the present invention, application frames are denoted by pseudo-code having the "Normal" tag, while debug frames are denoted by pseudo-code having a "Debug" tag.

The example communication session depicted in FIG. 8 adheres to the basic flow illustrated in FIG. 7 and, thus, will not be described in detail. Rather, the signaling diagram of FIG. 8 is intended to provide an example of how debug frames are interlaced within the normal communication flow between a host system and a smart card, and how the CDI 114 and the SCDI 110 promote the received frames accordingly.

Conclusion

Given the foregoing, it is to be appreciated that the innovative smart card development interface 110 and the interlaced debug protocol of the present invention transform the otherwise closed architecture of an otherwise typical smart card 104 into an application development tool. Moreover, the client development interface 114 transforms a common application development tool such as Microsoft's Visual BASIC, or Visual C/C++ into a smart card application development tool. Accordingly, the combination of the smart card development interface 110, the client development interface 114 and the interlaced debug protocol enable a developer to enter the smart card development market with minimal cost, thereby facilitating the development of applications for limited-sized markets and promoting the growth of the smart card industry. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

APPENDIX A: DEBUG PROTOCOL ELEMENTS

Protocol Details:

Example of coding of I-blocks (ISO 7816-3 amendment 2) (bits b8 (most significant bit) to b1 (least significant bit)):

b8=0 denotes a I-block b7 is the block number b6 is the More-data bit (0 indicates last block of sequence)

b5-b1 not used

According to one implementation, command or response is implied by the direction of the exchange (i.e., host sends commands, card send responses).

Debug Functions:
GetContext: Retrieve current IC Card context information.
SetContext: Set current IC Card context.
Go (or Run): Execute an application or applet.
RunToPC: Execute an application or applet until program counter (PC) is reached; akin to a step function.
WriteMemory: Write to a specified location in IC Card Memory
ReadMemory: Read a specified location in IC Card Memory
GetNextBranch: Retrieve the next branch.

Debug Events:
AppStart: denotes application/applet starts.
AppExit: denotes application/applet exits.
BreakPoint: Identify a PC wherein execution of application/applet is halted.

APPENDIX A: DEBUG PROTOCOL ELEMENTS

Step: Incrementally execute application/applet
Exception: denotes an exception.
DebugString: a string of information sent in a debug frame to host.
SimulatorExit: denotes the end of execution of simulator.

The invention claimed is:

1. An integrated circuit (IC) card comprising:
a memory device having stored therein a plurality of executable instructions;
an input/output (I/O) interface;
a smart card development interface (SCDI), coupled to the I/O interface, to receive and identify one or more debug frames interlaced within a normal communication flow between the IC card and a host system; and
a controller, coupled to the memory device and the SCDI, to execute at least a subset of the plurality of executable instructions to selectively implement at least one IC card application and a debug application which selectively controls the IC card application executing on the IC card,
wherein the SCDI is configured to route the received debug frames to the debug application executing on the IC card, while promoting the application frames to the IC card application executing on the IC card, subject to conditions imposed by the debug frames,
wherein the SCDI is configured to implement one or more debug features on the IC card according to debug instructions embedded within the received debug frames, wherein the debug features include one or more of read/write IC card memory, get/set breakpoints in a IC card application, sequentially step an IC card application, run an IC card application, or release a IC card application frame,
wherein the SCDI is configured to generate one or more response debug frames in response to one or more received debug frames, interlace the one or more response debug frames with response application frames, and send the one or more response debug frames and response application frames to the host system.

2. An IC card according to claim 1, wherein the smart card development interface includes a debug filter to identify and remove the debug frames from the normal communication flow.

3. An IC card according to claim 2, wherein the debug filter redirects the debug frames to a debug application on the IC card.

4. An IC card according to claim 1, wherein the debug application, responsive to debug instructions embedded within received debug frames, provides a user with a plurality of application debug features enabled in response to the received debug instructions.

5. An IC card according to claim 1, wherein the IC card communicates with a remote host system using a transport protocol comprising application data units (APDU) and debug protocol data units (DPDU).

6. An IC card according to claim 5, wherein the transport protocol is a standard smart card communication protocol, wherein the APDU and the DPDU adhere to the standard IC card communication protocol.

7. An IC card according to claim 5, wherein the smart card development interface further comprises a debug filter which identifies DPDU within the normal communication flow to redirect the DPDU to a debug application on the IC card.

8. An IC card according to claim 7, wherein the debug filter identifies DPDU within the normal communication flow by detecting an invalid source and/or destination address identifier within the debug frame.

9. An IC card according to claim 1, wherein the IC card communicates with a remote host system using a transport protocol comprising application data units (APDU) including normal application frames and debug frames.

10. A storage medium having stored thereon a plurality of executable instructions which, when executed, implement the smart card development interface of claim 1.

11. A method of debugging a smart card application, the method comprising:
receiving one or more debug frames interlaced with application frames comprising a normal communication flow between a smart card and a host system;
identifying the one or more debug frames by:
reading a source and/or destination address of frames comprising the normal communication flow; and
detecting invalid source and/or destination addresses in select frames denoting debug frames;
routing the received debug frames to a debug application executing on the smart card, while promoting the application frames to an application executing on the smart card, subject to conditions imposed by the debug frames;
implementing one or more debug features on the smart card according to debug instructions embedded within the received debug frames, wherein the debug features include one or more of read/write smart card memory, get/set breakpoints in a smart card application, sequentially step a smart card application, run a smart card application, and release a smart card application frame;
generating a response debug frame to a received debug frame;
interlacing the response debug frame with response application frames; and
sending the response debug frame and response application frames to a host system.

12. A storage medium having stored thereon a plurality of instructions which, when executed, implement the method of claim 11.

13. A computer system comprising:
a memory device having stored therein a plurality of instructions;
an input/output (I/O) interface;
a client development interface, coupled to the I/O interface, to receive and identify debug frames interlaced within the normal communication flow between the computer system and a removably coupled smart card; and
a processor, coupled to the memory device and the client development interface, to execute at least a subset of the plurality of instructions to implement one or more applications including a smart card development application having a debug environment to send and receive debug frames to the smart card, said debug frames being interlaced within the normal communication flow between the computer system and the smart card, wherein the debug frames written by the debug application invoke one or more of the following debug features: read/write smart card memory, get/set breakpoints in a smart card application, sequentially step a smart card application, run a smart card application, or release a smart card application frame, wherein the client development interface is configured to receive the normal communication flow from the smart card including the debug frames interlaced with the application frames, wherein the debug frames received from the smart card are received in response to debug frames issued by the computer system, wherein the application frames are promoted to an associated application executing within an application development tool executing on the computer, while the debug frames are promoted to the smart card development application having the debug environment on the computer system.

14. A computer system according to claim 13, wherein the memory device includes a plurality of executable instructions which, when executed, implement a debug application on the computer system to communicate with and control smart card resources.

15. A computer system according to claim 13, wherein the client development interface includes a debug filter to identify and remove the debug frames from the normal communication flow between the computer system and the smart card.

16. A computer system according to claim 15, wherein the debug filter redirects debug frames received from the smart card to a debug application executing on the computer system.

17. A computer system according to claim 13, further comprising a debug application, to write and read debug frames to and from the smart card, facilitating a number of application debugging features.

18. A computer system according to claim 13, wherein the computer system communicates with the smart card using a transport protocol comprising application data units (APDU) and debug protocol data units (DPDU).

19. A computer system according to claim 18, wherein the client development interface further comprises a debug filter which identifies DPDU within the normal communication flow to redirect the DPDU to a debug application executing on the computer system.

20. A computer system according to claim 19, wherein the debug filter identifies DPDU within the normal communication flow by detecting an invalid source and/or destination address identifier within the debug frame.

21. A storage medium having stored thereon a plurality of executable instructions which, when executed, implement the client development interface of claim 13.

22. A computer-implemented method for debugging a smart card application, the method comprising:
generating one or more debug frames containing debug instructions by a debug application executing within a smart card application development environment on a computer, in response to user interaction with the smart card application development environment;
interlacing the generated debug frames with one or more application frames generated according to an associated application executing on the computer;
sending the application frames with the interlaced debug frames to a removably coupled smart card, wherein the debug frames invoke one or more debug features of the smart card according to debug instructions embedded within the received debug frames, wherein the debug features include one or more of read/write smart card memory, get/set breakpoints in a smart card application, sequentially step a smart card application, run a smart card application, or release a smart card application frame;
receiving a normal communication flow from the smart card including debug frames interlaced with application frames, wherein the debug frames received from the smart card are received in response to debug frames issued by the computer; and
promoting received application frames to the associated application executing on the computer, while the debug frames are promoted to the debug application executing within the smart card application development environment on the computer.

23. A computer-implemented method according to claim 22, wherein generating one or more debug frames comprises populating a source and/or destination field of the debug frame with an invalid source and/or destination address.

* * * * *